United States Patent Office 3,436,419
Patented Apr. 1, 1969

3,436,419
DIFLUOROAMINOALKANE, PREPARED BY REACTING OXYGEN CONTAINING ORGANIC COMPOUNDS WITH HNF₂ AND SO₃
Richard P. Rhodes, Roselle, N.J., assignor to Esso Research and Engineering Company, a corporation of Delaware
No Drawing. Filed Mar. 12, 1962, Ser. No. 180,402
Int. Cl. C07c 85/08, 85/06, 85/02
U.S. Cl. 260—583    14 Claims This invention relates to the reaction of difluoramine HNF₂, and sulfur trioxide, SO₃, with organic compounds having an oxygen-containing functional group to synthesize high-energy compounds in which NF₂ groups replace the oxygen-containing functional groups. This method is a substantial advance in facilitating production of high-energy compounds for obtaining improved yields of the desired products and for obtaining new products.

Prior to the present invention, there have been many attempts to make high-energy compounds having more than one NF₂ group attached to a carbon atom in order to obtain more potent high-energy compounds useful as rocket propellant ingredients. In some of these instances, it was considered necessary to use tetrafluorohydrazine, N₂F₄, as a reactant at relatively high reaction temperatures for replacing a hydrogen constituent by an NF₂ group. Such high temperature reactions are difficult to carry out, are risky, and give low yields.

The synthesis work of the present invention has shown the feasibility of making high-energy compounds containing more than one NF₂/C in the organic compounds at relatively low reaction temperatures and in good yields. The formation of 1,1,2-tris-(NF₂) ethane,

CH₂(NF₂)CH(NF₂)₂ by reacting 1,2-bis-(NF₂) ethyl formate with HNF₂ in liquid SO₃ is a prototype of this synthesis. This kind of high-energy compound (1.5 NF₂/C) permits a 290 specific impulse to be reached when this compound is used as a fluorine oxidizer compounded with a polybutadiene-NF₂ adduct binder of [C₄H₆(NF₂)₁.₃] composition at about a 17 wt. percent level with hydrazinium nitroformate as the oxygen source.

Also, prior to the present invention, efforts were made to replace oxygen-containing functional groups by NF₂ groups in organic compounds by reaction with HNF₂, and this was successful only in the reaction of certain compounds, or to a limited extent with the use of certain media other than sulfur trioxide.

In the synthesis reaction of the present invention, this method can be applied to a wide variety of organic compounds having various oxygen-containing functional groups. Such compounds are expressed by the following general formulas:

RCH(NF₂)(OR')

RC(NF₂)(OR')(R")

wherein R represents H, a hydrocarbon radical or a hydrocarbon radical having substitutents which do not interfere, e.g. NF₂, halogen, nitro, or an oxygen-containing functional group; R' represents H, or a hydrocarbon radical (usually methyl, ethyl, or other alkyl radical); and R" represents H or a hydrocarbon radical. For making the high-energy, low molecular weight compounds, the starting organic reactant contains preferably 2 to 8 carbon atoms, as in the following examples:

1,2-bis-(NF₂) ethyl formate,

H₂C(NF₂)CH(NF₂)(OOCH)

1,2-bis-(NF₂) ethyl acetate,

H₂C(NF₂)CH(NF₂)(OOCCH₃)

1-difluoramino ethanol,

CH₃CH(NF₂)(OH)

Alpha-difluoramino diethyl ether,

CH₃CH(NF₂)OC₂H₅

1,2-bis-(NF₂) glycol,

CH(NF₂)(OH)CH(NF₂)(OH)

Bis-difluoramino dimethoxy propane, (NF₂)(OCH₃)CHCH₂CH(OCH₃)(NF₂)

Acetaldehyde,

CH₃CHO

Ethyl acetate,

CH₃CH₂OOCCH₃

Acetone, (CH₃)₂CO 1,2,3-tris-(NF₂) propyl acetate,

CH₂(NF₂)CH(NF₂)CH(NF₂)(OOCCH₃)

In some instances, the starting organic material may be an aldehyde, a ketone, an ester or an acetal, and may be such compounds containing carbon-to-carbon double bonds. Some of these compounds are unstable under the conditions required for reaction with N₂F₄. Reacting such compounds with HNF₂ and SO₃, it is possible to change the oxygen-containing functional group, e.g. to a hydroxyl group, and attached an NF₂ group to the carbon and make the further reaction with HNF₂ proceed with substitution of an NF₂ group for the hydroxyl group.

To carry out the reaction of the organic compounds having an oxygen-containing functional group with HNF₂ and SO₃, the HNF₂ (used preferably in excess) is dissolved in liquid SO₃, also used in excess of the organic reactant on a mole per mole basis. Suitable reaction temperatures are in the range of −30° to 130° C. with sufficient pressure from about 2 to 20 atmospheres to maintain the HNF₂ in liquid phase. If the reaction temperature is increased, the pressure is increased. The reaction time is in the range of a fraction of an hour to six hours, depending on the reaction conditions and the specific reactant. Preferably, the reactions are carried out at ambient room temperature in the range of about 25° C.

Following the reaction, the desired product is recovered by stripping off excess HNF₂, which has a boiling point of −24° C. under 1 atmosphere, and then fractionally distilling to separate the desired product. If the desired product is a high molecular weight compound less volatile than the SO₃, the SO₃ is extracted therefrom, and the product may be recovered from the raffinate phase.

The method of this invention is illustrated by the following examples.

EXAMPLE 1

1,2-bis-(NF₂) ethyl formate was reacted with a 10 mole ratio of HNF₂ and a 2.5 mole ratio of SO₃ at 42° C. for 3 hours. The product of the reaction was recovered by stripping off HNF$_2$ and distilling to obtain a 52% yield of 1,1,2-tris-(NF$_2$) ethane. Identification of this product was obtained by chemical analysis and nuclear magnetic resonance (NMR) analysis. The chemical analysis for the compound showed it had the composition (NF$_2$)$_2$CH—CH$_2$(NF$_2$)

Theory: C, 13.1%; N, 23.0%; H, 1.64%; F, 63%. Found: C, 13.56%; N, 22.75%; H, 1.72%; F, (58%).

Some violent decomposition occurred during the fluorine analysis procedure to make the fluorine value low. The NMR analysis was consistent with the structure of 1,1,2-tris-(NF$_2$) ethane.

EXAMPLE 2

In a glass reactor, 0.001089 mole of 1,2-bis-(NF$_2$) ethyl formate was reacted with 0.01125 mole HNF$_2$ dissolved in 0.00375 mole of liquid SO$_3$ at 25° C. under a pressure of 5 to 7 atm. for 3 hours. From the reaction product mixture was removed 0.00211 mole of N$_2$F$_4$ and SiF$_4$, and 0.00475 mole of HNF$_2$. A recovery was made of 0.000684 mole of 1,1,2-tris-(NF$_2$) ethane, giving a yield of 52.8 mole percent of theoretical. Analysis of this product showed a molecular weight of 186 compared to a theoretical of 183.

EXAMPLE 3

In a glass reactor, 0.001038 mole of 1,2-bis-(NF$_2$) ethyl acetate was reacted with about 0.011 mole of HNF$_2$ and 0.00375 mole of SO$_3$. After stripping out N$_2$F$_4$ and excess HNF$_2$, tris-1,1,2-(NF$_2$)$_3$ ethane was recovered. The conditions of reaction were the same as in Example 2.

EXAMPLE 4

In a glass reactor, acetaldehyde was reacted with an excess mole proportion of HNF$_2$ and an excess mole proportion of SO$_3$ at 25° C. for 2 hours under a pressure of 5 to 7 atm. In this reaction, 1-(NF$_2$) ethanol was formed in situ as an intermediate product and this intermediate product quantitatively formed 1,1-bis-(NF$_2$) ethane which is recovered by removing by-produce N$_2$F$_4$ and excess HNF$_2$ and then distilling the 1,1-bis-(NF$_2$) ethane product.

EXAMPLE 5

To prepare 1,1,2,2-tetrakis-(NF$_2$) ethane, runs have been made with 1,2-bis-(NF$_2$) glycol for reaction with HNF$_2$ in liquid SO$_3$ under synthesis conditions at 80° C. for a reaction period of 15 minutes. A white, colorless liquid was obtained which is indicated to be a mixture of 1,1,2,2-tetrakis-(NF$_2$) ethane, 1,2,2-tris-(NF$_2$) ethanol, and various cyclic products. This reaction is indicated to require more severe conditions for the reaction with HNF$_2$ and SO$_3$. Alternatively, runs have also been made using 1,2-bis-(NF$_2$) glycol diacetoxy derivative.

EXAMPLE 6

Acrolein diacetate (or 1,1-diacetoxy propene-3) is treated with an excess of HNF$_2$ for 40 hrs. at 25° C. The resulting reaction mass is extracted with water to yield 1-(NF$_2$) 1-acetoxy propene-3.

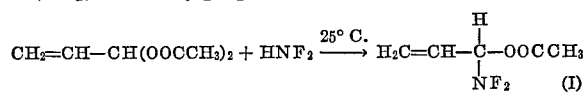
(I)

This olefinic material (I) is then reacted with N$_2$F$_4$ at 450 p.s.i.a. pressure and 90° C. for 4 hrs. The product of this reaction is the 1-acetoxy-tris-(difluoramino) propane.

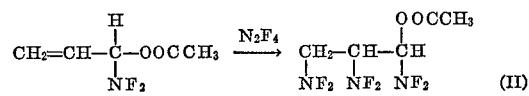
(II)

This ester compound (II), which is 1,2,3-tris-(NF$_2$) propyl acetate, can now be reacted in the fashion of Example 3 to produce the new high-energy oxidizer tetrakis-(difluoramino) propane recovered.

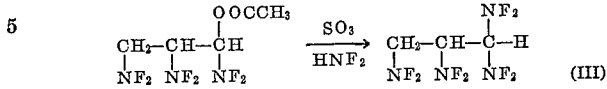
(III)

Identification of compound (III) by molecular weight and elemental analysis is:

Theory, C$_3$H$_4$(NF$_2$)$_4$: C, 14.5%; N, 22.5%; M.W., 248. Found: C, 15.45%; N, 22.32%; M.W., 249.

This product is a high-energy oxidizer and is termed 1,2,3,3-tetrakis-(NF$_2$) propane.

In carrying out reactions such as those described in the foregoing examples using H$_2$SO$_4$ with SO$_3$, yields were much lower and some of the reactions failed to give significant yields when H$_2$SO$_4$ was used.

By reacting alpha-(NF$_2$) diethyl ether with HNF$_2$ and SO$_3$, a product yield of 72% 1,1-bis-(NF$_2$) ethane was obtained using a reaction temperature of 42° C. under a pressure of 7 atm. In using H$_2$SO$_4$ with HNF$_2$ on the alpha-(NF$_2$) n-propyl ethyl ether, no appreciable amount of product was obtained.

The liquid SO$_3$ may aid the reaction of the HNF$_2$ with organic compounds having an oxygen-containing functional group in several respects, e.g. (1) acting as a displacing agent of the functional group; (2) reacting to destroy or complex with the displaced oxygen-containing group; (3) providing a high dielectric constant medium for the reaction while being relatively inert toward the NF$_2$ group. In the reactions, an alkoxy or ether linkage may tend to form a carbonyl group, which in turn reacts with HNF$_2$ to form a hydroxyl group attached with an NF$_2$ group to the same carbon. Then the hydroxyl group is displaced by an NF$_2$ group. The carbonyl group may also be present in a ketone, either aliphatic or cyclic.

The organic reactants having an oxygen-containing function, e.g. a hydroxy, carbonyl, alkoxy, or carboxy function, preferably should not have an ethylenic double bond to avoid forming complex mixtures. Thus, for studying the reaction of organic compounds having an oxygen-containing function, the preferred organic compounds have an alkyl group attached to a carbon atom which is linked to oxygen in the oxygen-containing function. The major portion of the molecule may have a substituent group, e.g. nitro, one of the oxygen-containing functional groups, or one or more NF$_2$ substituent groups, as in the example of 1,2-bis-(NF$_2$) ethyl formate, 1,1,-bis-(NF$_2$) glycol, etc. The carbon atom in the organic reactant which is linked to oxygen in the oxygen-containing function may also be linked to an NF$_2$ group.

The reaction of HNF$_2$ with carbonyl compounds, e.g. aldehydes, ketones, esters and carboxylic acids, and with alcohols, ethers and acetals, was studied at room temperature in the presence of liquid SO$_3$, in the presence of H$_2$SO$_4$, and without the presence of such acids to evaluate some variable effects on product distribution, rate and yield. Some of the mechanisms indicated by these studies will be set forth, although the invention is not to be limited by any theory on the mechanism of reaction.

From the studies of the HNF$_2$ reaction with the organic compounds having oxygen-containing functions, it appears that two main reactions may occur when the starting organic reactant has a carbonyl function. The carbonyl function may undergo a change to form a difluoramino alcohol by simple HNF$_2$ addition, and with this step may occur the formation of a gem bis-NF$_2$ compound by substitution of an NF$_2$ group for the hydroxy group. The hydroxy group which is displaced may form water, which is removed by complexing with the liquid SO$_3$. Another reaction which occurs may be the formation of an ether by a side reaction. These reactions are set forth as follows:

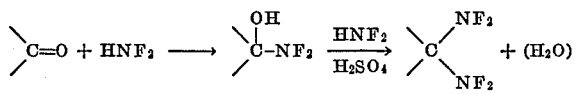

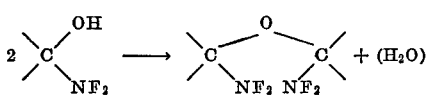

The first step appears to take place for a wide variety of the carbonyl compounds. The equilibria varied from the case of acid aldehyde where no carbonyl could be detected in the products, to the cases of acetone and isobutylaldehyde where mobile equilibria of said end products are established without the presence of acid. For example, in the reaction of acetone with $HNF_2$, but with no liquid $SO_3$ or $H_2SO_4$ present, 2-$(NF_2)$-2 hydroxypropane and acetone tend to come into equilibrium. When the $HNF_2$ is removed from the reaction zone, the equilibrium tends to shift back to the formation of more acetone and $HNF_2$.

Mineral acid in trace amounts has been found to strongly catalyze the reaction of $HNF_2$ with the organic compounds having an oxygen-containing function. The magnitude of the effect of the traces of acid has been measured by using acetyl chloride which forms HCl by reaction with hydroxyl groups. In forming ethyl difluoramino alcohol, traces of $H_2SO_4$ or of $SO_3$ have a similar effect.

The main variables studied with respect to the second phase of the reaction and for the overall reaction were the effects of acid strength and $HNF_2$ concentration. Acid strength is an important variable, as shown in the following table, on the reaction of $HNF_2$ with acetaldehyde using anhydrous liquid $SO_3$, 96% $H_2SO_4$ and 86% $H_2SO_4$ as the media in which the reaction was carried out under comparative conditions to obtain formation of the gem bis-$(NF_2)$ ethane compound. The results are summarized in the following table:

| Acid strength | $SO_3$ | 96% $H_2SO_4$ | 86% $H_2SO_4$ |
| --- | --- | --- | --- |
| Yield gem bis cpd., mole percent | 100 | 90 | 8.5 |
| Moles ether/100 moles bis | 0 | 0 | 38 |
| Reaction time (25° C.), hrs | 1.5 | 4 | 4 |

The data shown in the foregoing table indicate that it is much better to use $SO_3$ than $H_2SO_4$, and that water, except for that amount which may be formed or introduced in small amounts by the reactants, slows down the rate of desired reaction and gives rise to by-products, in this instance ether.

An increase in the $HNF_2$ concentration was found to increase the conversion of the organic compound to a product having more $NF_2$ groups at a fixed reaction time. In the study of the conversion of acetaldehyde to 1,1-bis-$(NF_2)$ ethane by the reaction of acetaldehyde with $HNF_2$, it was found that some ether formed when 96% $H_2SO_4$ is used during the first period of reaction, e.g. 1 to 2 hours. In using liquid anhydrous $SO_3$, the proportion of ether is suppressed in a much shorter period. Thus there is an indication that the ether formation is simultaneous with the gem bis-difluoramino formation, but as the system is mobile, the gem bis-$(NF_2)$ compound is favored. Similarly, as the concentration of $HNF_2$ is increased, the amount of ether present is kept at a low proportion with respect to the amount of bis-$(NF_2)$ compound in the product.

From a study of the rates of reaction and of the intermediate products, it appears that compounds having an alkoxy function, e.g. ethers and acetals, have these functions converted to a carbonium ion, which is in equilibrium with a difluoramino alcohol-sulphur trioxide complex, an hydroxy-$SO_3$ complex group and an $NF_2$ group being attached to the same carbon atom which was the first carbon in the ether or acetal. An ester group is replaced by an $NF_2$ group just as the hydroxy group is replaced by an $NF_2$ group. Accordingly, the easiest reactions to carry out are those in which a hydroxy group and an $NF_2$ group are attached to the same carbon, provided a vicinal carbon atom is not linked to both a hydroxy function and an $NF_2$ group.

The high density and high $NF_2$ loaded compounds have been determined to be capable of giving increased impulse to a solid rocket propellant. For example, the 1,1,2-tris-$(NF_2)$ ethane in the amount of 40 wt. percent with 38 wt. percent hexanitroethane, 2 wt. percent boron powder, and 20 wt. percent of polybutadiene-$N_2F_4$ adduct as binder has an Isp. of 299. A still higher Isp. of 304 can be obtained with 45 wt. percent 1,1,2,2-tetrakis-$(NF_2)$ ethane, 31.5 wt. percent hexanitroethane, 3.5 wt. percent boron powder, and 20 wt. percent of the binder.

What is claimed is:

1. Process for the synthesis of a high-energy organic compound containing an $NF_2$ group attached to a carbon atom which comprises, reacting an acyclic organic compound reactant having an oxygen-containing function of the group consisting of hydroxy, carbonyl oxygen, alkoxy, and carboxy functions with $HNF_2$ and $SO_3$ in liquid phase to replace said function by an $NF_2$ group linked directly to a carbon constituent to which oxygen of the function was directly linked.

2. Process as defined in claim 1 wherein the organic compound reactant has an alkyl group attached to the oxygen-containing function.

3. Process as defined in claim 1 wherein the organic compound reactant has an alkyl group attached to a carbon atom which is linked directly to the oxygen in the oxygen-containing function.

4. Process as defined in claim 1 wherein the organic compound reactant has an alkyl group attached to the carbon atom which is linked directly to oxygen in the function and which is linked directly to an $NF_2$ group.

5. Process as defined in claim 1 wherein the organic compound reactant has a substituted alkyl group attached to the carbon atom which is linked directly to oxygen in the function.

6. Process for synthesizing 1,1,2-tris-$(NF_2)$ ethane which comprises, reacting 1,2-bis-$(NF_2)$ ethyl formate with at least equal mole proportions of $HNF_2$ and $SO_3$ in liquid phase, and recovering the resulting tris-$(NF_2)$ ethane.

7. Process for synthesizing 1,1,2-tris-$(NF_2)$ ethane which comprises, reacting 1,2-bis-$(NF_2)$ ethyl acetate with at least equal mole proportions of $HNF_2$ and $SO_3$ in liquid phase, and recovering the resulting tris-$(NF_2)$ ethane.

8. Process for synthesizing 1,1-bis-$(NF_2)$ ethane which comprises, reacting acetaldehyde with at least equal mole proportions of $HNF_2$ and $SO_3$ in liquid phase and recovering said bis-$(NF_2)$ ethane as product.

9. Method for synthesizing 1,1,2,2-tetrakis-$(NF_2)$ ethane which comprises, reacting 1,2-bis-$(NF_2)$ glycol with $HNF_2$ dissolved in liquid $SO_3$ in proportions to replace the OH groups by $NF_2$ groups, and recovering said tetrakis-$(NF_2)$ product.

10. Method for synthesizing 1,2,3,3-tetrakis-$(NF_2)$ propane as product which comprises, reacting 1,2,3-tris-$(NF_2)$ propyl acetate with at least equal mole proportions of $HNF_2$ in liquid $SO_3$, and recovering said product.

11. Method for synthesizing an $NF_2$-substituted alkane containing more than one $NF_2$ group per carbon which comprises, reacting at least an equal mole proportion of $HNF_2$ with a $C_2$ to $C_8$ organic compound having an $NF_2$ group attached to each carbon atom of an alkyl group with an oxygen-containing function of the class consisting of hydroxy, carbonyl-oxygen, alkoxy, and carboxy functions linked to a carbon atom in said alkyl group by oxygen of the function, the $HNF_2$ being present in liquid $SO_3$ in reacting with said organic compound at $-30°$ to +130° C. under a pressure of about 2 to 200 atmospheres, and recovering the resulting NF₂-substituted alkane in which an NF₂ group is substituted for the oxygen-containing function.

12. 1,1,2,2-tetrakis-(NF₂) ethane.
13. 1,2,3,3-tetrakis-(NF₂) propane.
14. Process for the synthesis of a high-energy organic compound containing NF₂ groups attached directly to carbon atom constituents of the compound in replacement of oxygen-containing functions attached to said carbon constituents, the organic compound reactant being selected from the group consisting of aldehydes, ketones, esters, alcohols, ethers and acetals which have the oxygen-containing function of the group consisting of —OH, =O, alkoxy and carboxy functions directly linked to a carbon atom of the organic reactant, which comprises reacting the organic reactant with a sufficient stoichiometric proportion of HNF₂ and SO₃ in liquid phase to make the NF₂ from the HNF₂ substitute for the oxygen-containing function of the organic compound reactant, and recovering the resulting product in which the substituted NF₂ group is present as a substituent directly attached to the carbon aom which was directly linked to oxygen of the oxygen-containing function.

References Cited

Hoffman et al.: Chem. Reviews, vol. 62, pp. 12 to 18 (1926).

LELAND A. SEBASTIAN, *Primary Examiner.*

U.S. Cl. X.R.

260—482, 584; 149—19, 22, 109